US008457357B2

(12) United States Patent
Foote et al.

(10) Patent No.: US 8,457,357 B2
(45) Date of Patent: Jun. 4, 2013

(54) RELATIVE POSE ESTIMATION OF NON-OVERLAPPING CAMERAS USING THE MOTION OF SUBJECTS IN THE CAMERA FIELDS OF VIEW

(75) Inventors: Eric Foote, Pittsburgh, PA (US); G. Peter K. Carr, Pittsburgh, PA (US); Yaser Sheikh, Pittsburgh, PA (US); Iain Matthews, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 27 days.

(21) Appl. No.: 13/292,299

(22) Filed: Nov. 9, 2011

(65) Prior Publication Data
US 2013/0114851 A1   May 9, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

PUBLICATIONS

Tsuhan Chen, et al., "Accurate self-calibration of two cameras by observation of a moving person on a ground plane," Proceedings of the IEEE International Conference on Video and Signal Based Surveillance, 2007.
Fengjun Lv, et al., "Camera Calibration from Video of a Walking Human," IEEE Transactions on Pattern Analysis and Machine Intelligence, vol. 28, No. 9, Sep. 2006, pp. 1513-1518.
Imran Junejo, et al., "Robust Auto-Calibration from Pedestrians," Proceedings of the IEEE International Conference on Video and Signal Based Surveillance, 2006.
Nils Krahnstover, et al., "Bayesian Autocalibration for Surveillance," Proceedings of the Tenth IEEE International Conference on Computer Vision, 2005.

*Primary Examiner* — Stephen R Koziol
*Assistant Examiner* — Amandeep Saini
(74) *Attorney, Agent, or Firm* — Farjami & Farjami LLP

(57) ABSTRACT

A relative pose between two cameras is determined by using input data obtained from the motion of subjects, such as pedestrians, between the fields of view of two cameras, determining trajectory information for the subjects, and computing homographies relating lines obtained from trajectories in the first image data to lines obtained from the trajectories in the second image data. The two fields of view need not overlap.

30 Claims, 13 Drawing Sheets

RELATIVE POSE ESTIMATION OF NON-OVERLAPPING CAMERAS USING THE MOTION OF SUBJECTS IN THE CAMERA FIELDS OF VIEW

BACKGROUND

There are instances in which it may be desirable to compute the location and orientation (a combination referred to herein as "pose") of a second camera relative to a first camera using images gathered from the two cameras as inputs. Some prior methods have been based on determining correspondences between points in the image gathered by the first camera and points in the image gathered by the second camera. However, such methods rely upon at least a portion of the image gathered by the first camera overlapping at least a portion of the image gathered by the second camera. To compute the pose of one camera relative to another camera in an instance in which the two camera images do not overlap, methods have been proposed that are based on such varied techniques as: employing a mirror to allow the two cameras to view common calibration objects; extracting edge features in order to compute vanishing points in each image; and observing objects entering and leaving the camera views. It is also known that information useful to solving the problem of computing relative camera pose can be obtained from observations of objects entering and leaving the camera views by computing the time between observing an object leaving one camera view and observing the same object entering the other camera view. Some prior methods have included using observations of pedestrians in the two camera images.

SUMMARY

Embodiments of the present invention relate to a system and method for determining a relative pose between two cameras using input data obtained from the motion of subjects in the camera fields of view. In an exemplary embodiment, first image data representing a first field of view of a first video camera is received, and second image data representing a second field of view of a second video camera is received.

Trajectory information is determined from the first and second image data. The trajectory information represents characterizable trajectories or paths along which each of at least four persons or other suitable subjects move between the first field of view and the second field of view. Although the term "four persons" or "four subjects" is used for purposes of clarity, two or more of the trajectories can be those of the same individual or other unique subject in an instance in which the same individual or subject appears in multiple images of the fields of view that are captured at different times.

For each person or other subject represented by the trajectory information, a plurality of head position points in the first image data and a plurality of head position points in the second image data are determined. Each plurality of head position points corresponds to successive positions of a head region of a person at a corresponding plurality of timepoints spanning a time period. Similarly, for each person or other subject represented by the trajectory information, a plurality of foot position points in the first image data and a plurality of foot position points in the second image data are determined. Each plurality of foot position points corresponds to the plurality of head position points and corresponds to successive positions of a foot region of the person at a corresponding plurality of timepoints spanning a time period. The terms "head" and "foot" refer, respectively, the topmost and bottommost region of a subject, regardless of whether the subject is a human, animal or inanimate object.

At least eight lines in the first image data are determined using the head position points and foot position points. The eight lines comprise at least four head lines and at least four foot lines. The eight lines are determined by fitting each plurality of head position points in the first image data to one of the head lines and fitting each plurality of foot position points to one of the foot lines.

Similarly, at least eight lines in the second image data are determined using the head position points and the foot position points. The eight lines comprise at least four head lines and at least four foot lines. The eight lines are determined by fitting each plurality of head position points in the second image data to one of the head lines and fitting each plurality of foot position points to one of the foot lines. Each head line in the second image data corresponds to one head line in the first image data, and each foot line in the second image data corresponds to one foot line in the first image data.

A first planar homography and a second planar homography are then computed. Each of the first and second planar homographies represents a relationship between each line in the first image data and a corresponding line in the second image data. Finally, the relative pose between the first video camera and the second video camera is computed in response to the first planar homography and second planar homography.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
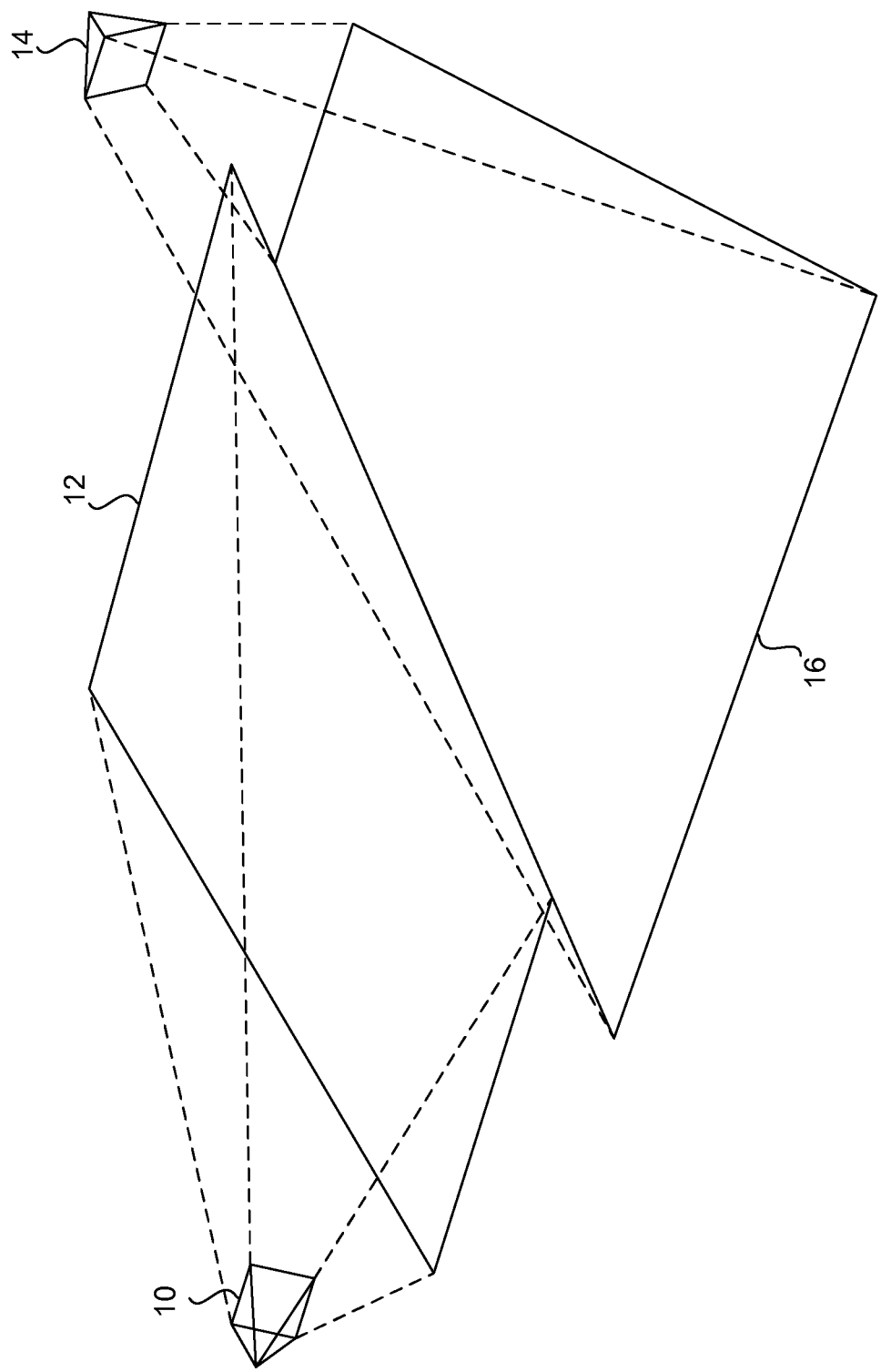
FIG. 1 illustrates an exemplary environment in which two cameras have non-overlapping fields of view of a ground plane.
Figure 2A:
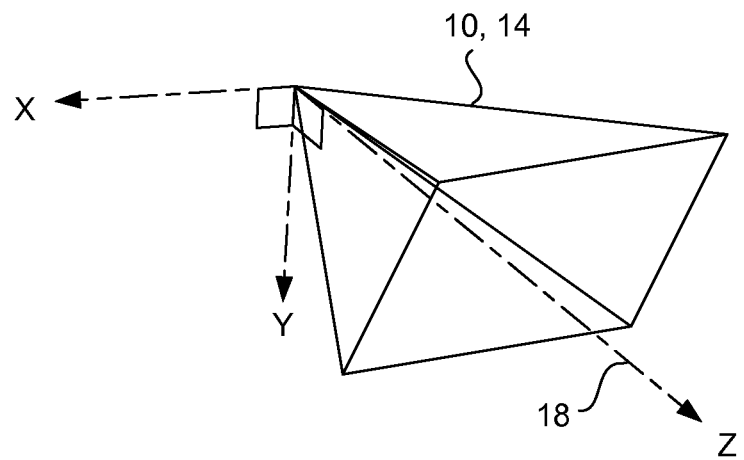
FIG. 2A is a perspective view of a conceptualized camera of FIG. 1, showing the camera's frame of reference.
Figure 2B:
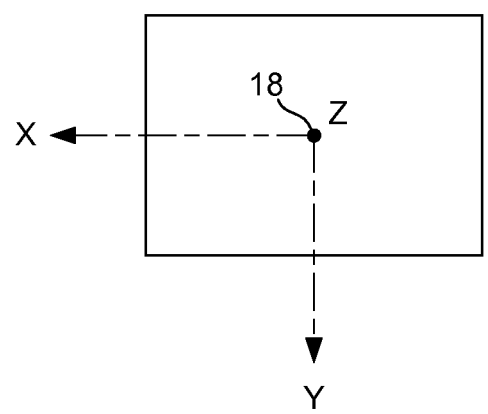
FIG. 2B is a front elevation view of the conceptualized camera of FIGS. 1 and 2A, showing the camera's frame of reference.

As illustrated in FIG. 1, in an illustrative or exemplary embodiment of the invention, a first video camera 10 has a first field of view 12, and a second video camera 14 has a second field of view 16. In the exemplary embodiment, fields of view 12 and 16 are co-planar and do not overlap, though they may overlap in other embodiments. As illustrated in FIGS. 2A-2B, each of video cameras 10 and 14 has a central optical axis 18 that generally corresponds to the direction in which it is pointing and thus substantially determines the location of its corresponding field of view 12 and 16. The "pose" of each of video cameras 10 and 14 is defined by its location in space as well as the orientation of its central optical axis 18 with respect to a 3-axis frame of reference. An exemplary frame of reference is shown in FIGS. 2A-2B as having a Z axis aligned with the central optical axis 18, and X and Y axes at mutually perpendicular angles to each other and the Z axis.

The system and method of the exemplary embodiment relate to determining the relative pose between video cameras 10 and 14 using input data obtained from pedestrian motion. The relative pose between video cameras 10 and 14 is defined by the difference between the location in space (i.e., the camera's coordinate system) and the orientation of central optical axis 18 of video camera 10 and the location in space and orientation of central optical axis 18 of video camera 14. Thus, the relative pose information includes a 3-dimensional spatial offset or translation between video cameras 10 and 14 and a 3-dimensional angular offset or rotation between their central optical axes, i.e., the directions in which video cameras 10 and 14 are pointing.

Figure 3:
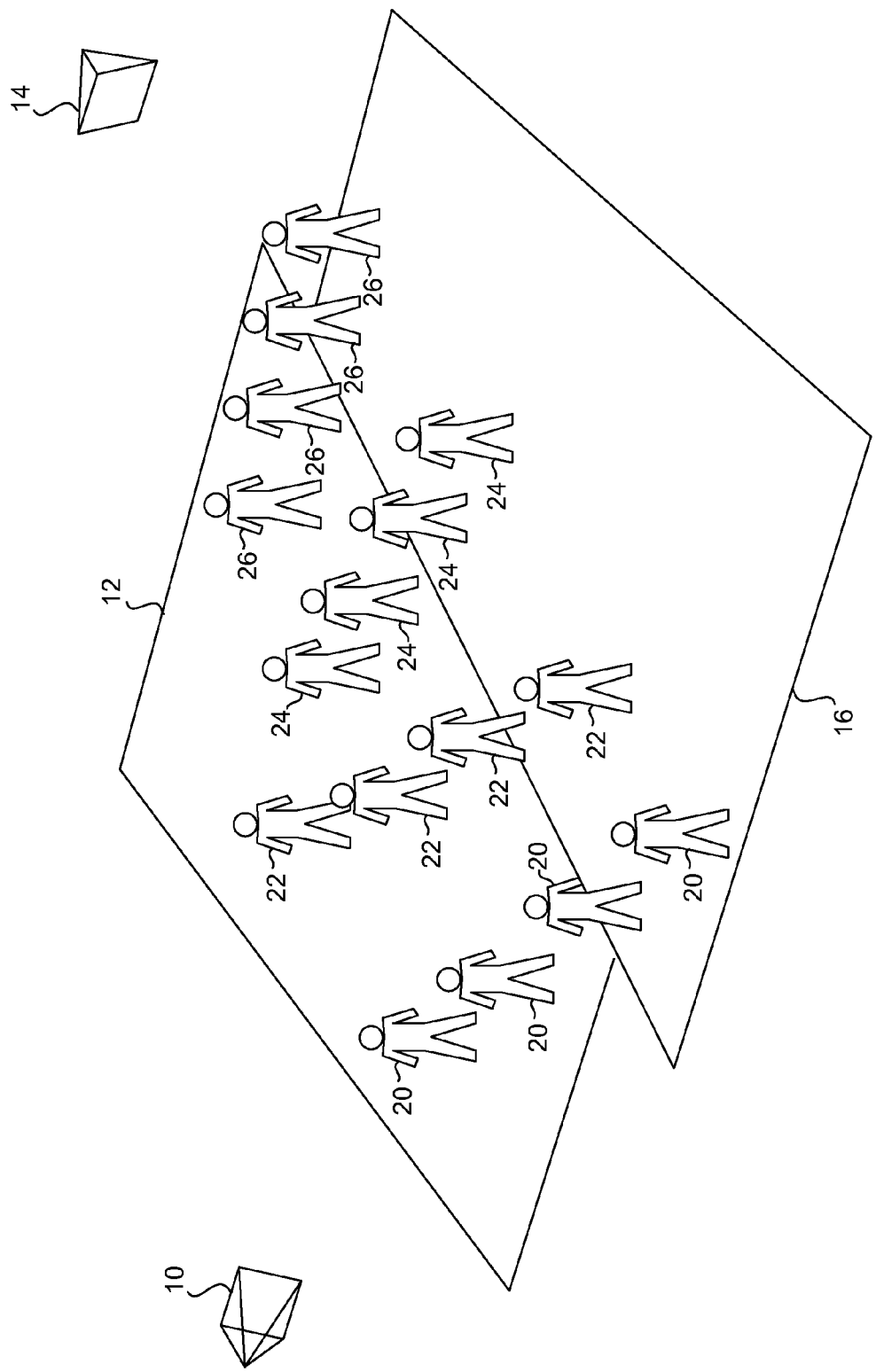
FIG. 3 is similar to FIG. 1, but with four exemplary pedestrians shown on the ground plane at successive points in time.

Although the system and method are described in further detail below, FIG. 3 illustrates the pedestrian motion concept. In an exemplary embodiment, at least four persons (pedestrians) 20, 22, 24 and 26 are identified in the first and second fields of view 12 and 16 who move along substantially linear trajectories or paths within and between first field of view 12 and second field of view 16. That is, part of each person's trajectory is within first field of view 12 and part is within second field of view 16. Thus, each person 20, 22, 24 and 26 will appear in multiple frames of video captured by each of first and second video cameras 10 and 14. It should be noted that persons 20, 22, 24 and 26 need not be different individuals. For example, in an instance in which the image data described below includes images captured by video cameras 10 and 14 at different times, the image data can represent the same individual moving along two or more trajectories. Also, although in the exemplary embodiment the trajectories are linear, in other embodiments the trajectories can have any shape that can be mathematically characterized in a way that enables the location of a person or other subject at a future point in time to be predicted, such as a circle, ellipse or parabola.

Although it is possible to use the motion of subjects other than pedestrians to determine relative camera pose, pedestrians have useful properties that include having a height that falls within a relatively narrow range and being readily susceptible of being modeled as a vertical line between head and foot. Therefore, although in the exemplary embodiment the subjects whose trajectories are determined are pedestrians, in other embodiments the subjects can be of any other type, such as an animal or vehicle.

For purposes of illustration, the environment in which persons 20-26 move is shown in FIG. 3 as though the multiple frames of video in which persons 20-26 appear were superimposed on each other. That is, each of persons 20-26 is shown in FIG. 3 at the positions the person would occupy at successive points in time. Also for purposes of illustration, the environment in which persons 20-26 move is shown in FIG. 3 from a perspective of an all-encompassing ("observer's-eye") field of view that is greater than first and second fields of view 12 and 16 of first and second video cameras 10 and 14. The entire trajectory of none of persons 20-26 is within both the first and second fields of view 12 and 16. That is, neither of video cameras 10 and 14 can see the entire trajectory of any of persons 20-26. For example, in an instance in which the environment shown in FIG. 3 is a stadium or athletic field, the perspective would be that of a spectator (observer) who might be sitting in the stands or bleachers overlooking the field. As described below, persons 20-26 and their trajectories can be identified and the corresponding trajectory information can be input into a system 30 (FIG. 4) using any suitable combination of manual or automated methods.

Figure 4:
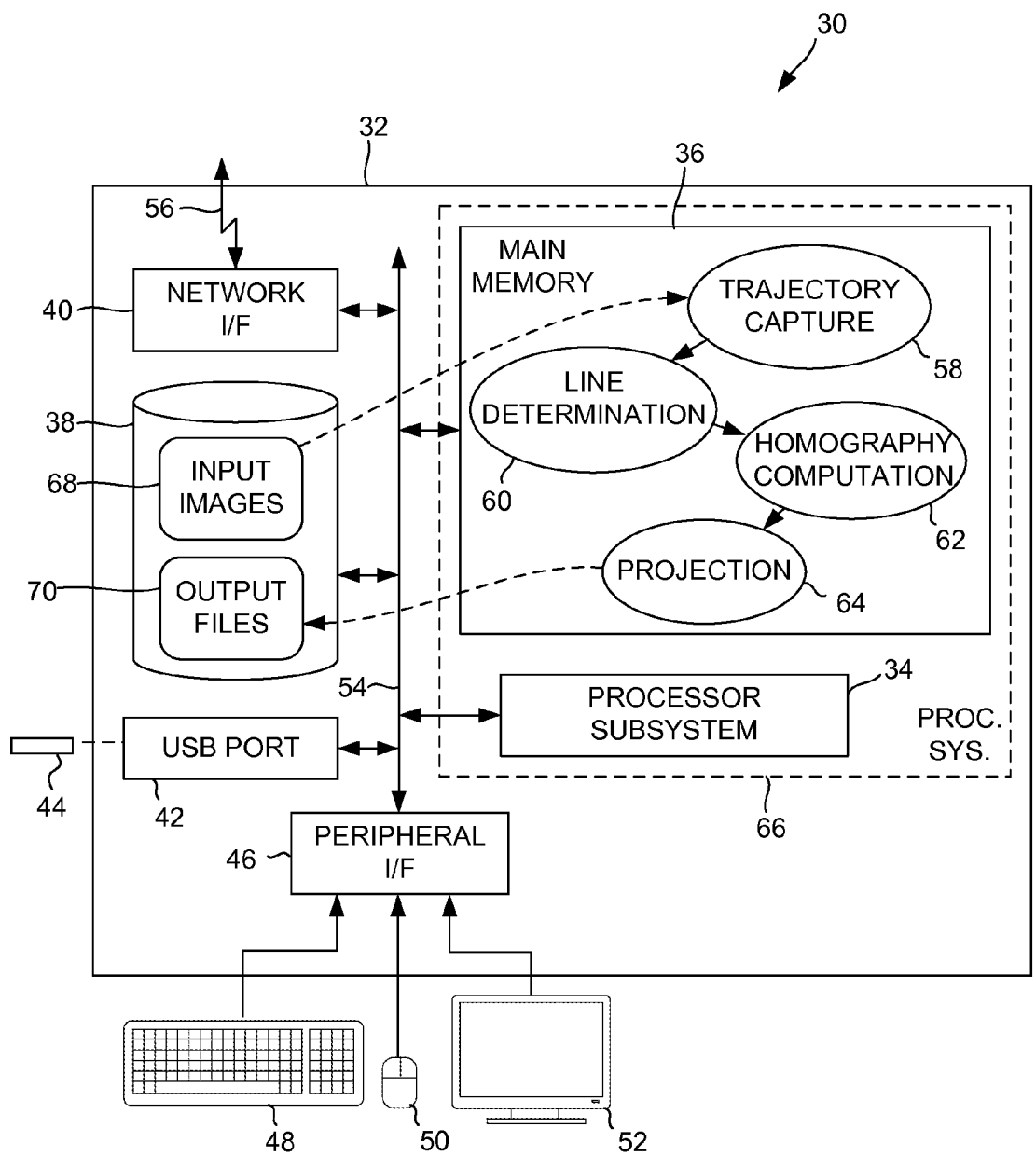
FIG. 4 is a block diagram of an exemplary computer system that is programmed or configured to effect a method for determining a relative pose between two cameras.

As illustrated in FIG. 4, an exemplary system 30 for determining a relative pose between first and second video cameras 10 and 14 includes a computer system 32. In the exemplary embodiment, computer system 32 essentially can be a personal computer system that has been suitably programmed or otherwise configured, as described below. But for the software elements described below, computer system 32 can have a conventional structure and configuration. Accordingly, computer system 32 includes hardware and software elements of the types commonly included in such computer systems, such as a processor subsystem 34, a memory subsystem 36, non-volatile data storage 38 (e.g., a hard disk drive, FLASH memory, etc.), a network interface 40, and one or more ports 42 for reading from and writing to external devices. Such external devices can include a removable data storage medium 44, such as a Universal Serial Bus (USB) "thumb drive." Computer system 32 also includes a peripheral interface 46 through which data communication with a keyboard 48, mouse 50 and display 52 occurs. Peripheral interface 46 can comprise USB ports of the same type as port 42 or any other suitable type of ports. In other embodiments, computer system 32 can include hardware and software elements in addition to those described herein or that are different from those described herein. The above-described elements can communicate with one another via a digital bus 54. Computer system 32 can communicate with remote devices (not shown) via a network connection 56, such as a connection to the Internet.

Memory subsystem 36 is generally of a type in which software elements, such as data and programming code, are operated upon by processor subsystem 34. In accordance with conventional computing principles, processor subsystem 34 operates in accordance with programming code, such as operating system code and application program code. In the exemplary embodiment of the invention, such application program code can include the following software elements: a trajectory capture element 58, a line determination element 60, a homography computation element 62, and a projection element 64. Although these software elements are conceptually shown for purposes of illustration as stored or residing in memory subsystem 36, persons skilled in the art to which the invention relates can appreciate that such software elements may not reside simultaneously or in their entireties in memory subsystem 36 but rather may be retrieved in portions on an as-needed basis, e.g., in code segments, files, modules, objects, data structures, instruction-by-instruction, or any other suitable basis, from data storage 38 or other suitable source (e.g., via network connection 56). Note that although only trajectory capture element 58, line determination element 60, homography computation element 62, and projection element 64 are shown for purposes of clarity, other software elements of the types conventionally included in computers systems that enable them to operate properly are generally included, such as operating system software.

It should be noted that, as programmed or otherwise configured in accordance with the above-described software elements, the combination of processor subsystem 34, memory subsystem 36 (or other element or elements in which software is stored or resides) and any related elements generally defines a programmed processor system 66. It should also be noted that the combination of software elements and the medium on which they are stored or in which they reside (e.g., memory subsystem 36, data storage 38, removable data storage medium 44, etc.) generally constitutes what is referred to in the patent lexicon as a "computer program product."

In the exemplary embodiment, a computer-implemented method for determining relative camera pose can be initiated by a person (user) who operates computer system 32. A user can operate computer system 32 locally using keyboard 48, mouse 50, display 52, etc., or remotely via network connection 56. In operation, and in accordance with the effects of software elements that can include trajectory capture element 58, line determination element 60, homography computation element 62, and projection element 64, computer system 32 can provide a suitable user interface through which the user can interact with computer system 32. Although such a user interface is not described herein in further detail, it should be noted that in the exemplary embodiment a user can control computer system 16 in a manner that causes computer system 16 to obtain input images 68 from, for example, data storage 38, effect the methods described below, and produce output data (files) 70 that include information describing the relative pose between first and second video cameras 10 and 14.

Figure 5:
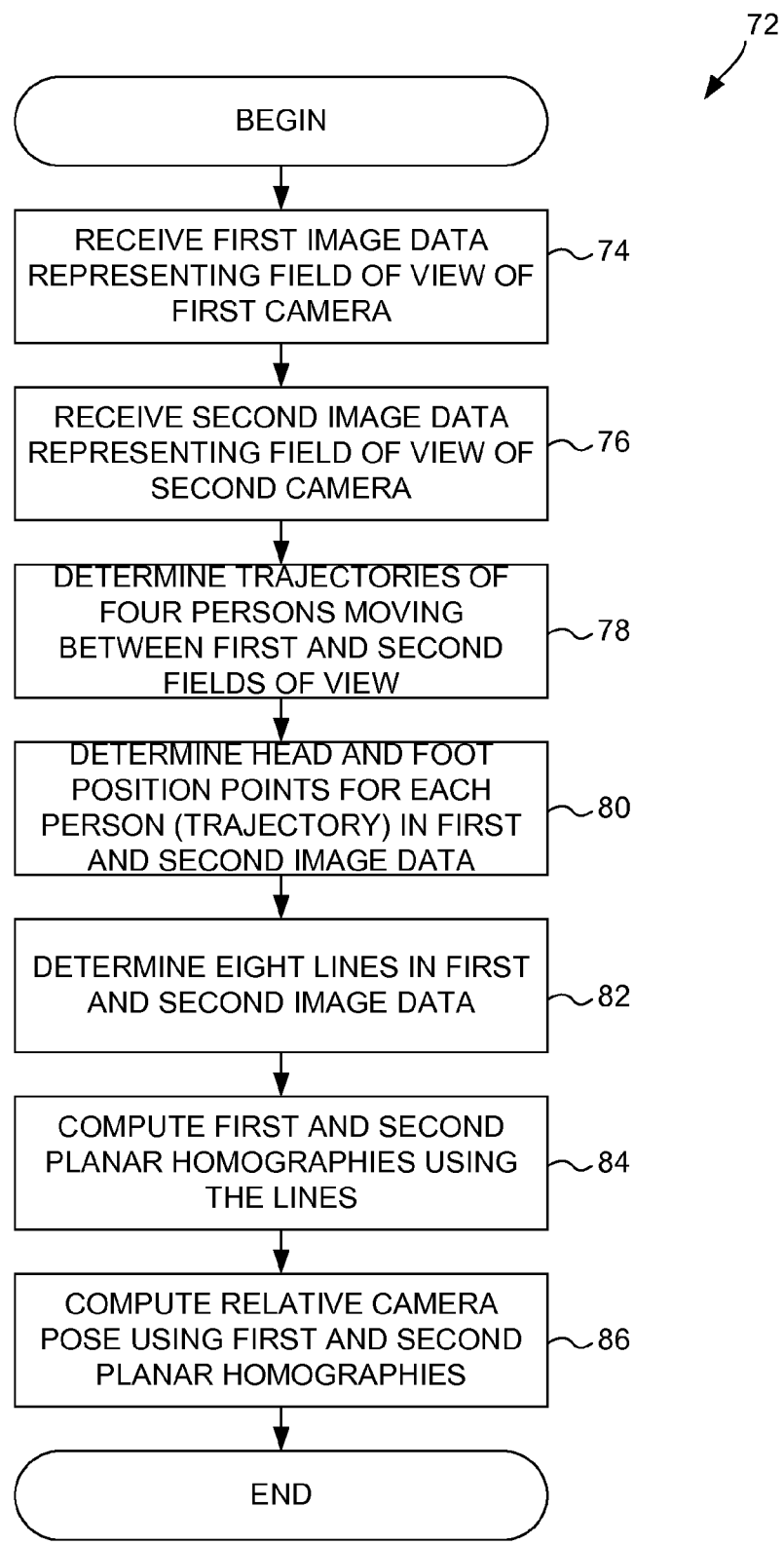
FIG. 5 is a flow diagram illustrating an exemplary method for determining a relative pose between two cameras.

The flowchart 72 illustrated in FIG. 5 represents an exemplary method for determining relative camera pose. A person of ordinary skill in the art is readily capable of implementing this exemplary method in the form of software elements such as trajectory capture element 58, line determination element 60, homography computation element 62, and projection element 64. The blocks of flowchart include: a block 74 that indicates receiving first image data representing first field of view 12; a block 76 that indicates receiving second image data representing second field of view 16; a block 78 that indicates determining trajectories of (at least) four persons moving between first field of view 12 and second field of view 16; a block 80 that indicates determining head and foot position points for each person (trajectory) in the first and second image data; a block 82 that indicates determining (at least) eight lines in the first and second image data using the head and foot position points; a block 84 that indicates computing first and second planar homographies using the (at least) eight lines; and a block 86 that indicates computing the relative camera pose using the first and second planar homographies.

The exemplary method can be performed in the order indicated by blocks 74-86 or, in other embodiments, any other suitable order. Although only method steps or actions indicated by blocks 74-86 are described, in other embodiments the method can include additional steps or actions.

As indicated by block 74, first image data representing first field of view 12 is received. For example, computer system 32, operating in accordance with trajectory capture element 58, can operate upon or otherwise receive input images 68 that have been captured by first video camera 10. Similarly, as indicated by block 76, second image data representing second field of view 16 is received. For example, computer system 32, operating in accordance with trajectory capture element 58, can operate upon or otherwise receive input images 68 that have been captured by second video camera 14. The input images can comprise successive frames of digital video information captured by first and second video cameras 14. The surface on which persons 20-26 (FIG. 1) appear to walk in the video images can be referred to as a ground plane.

As indicated by block 78, trajectories of (at least) four persons moving between first field of view 12 and second field of view 16 are determined. For example, computer system 32, operating in accordance with trajectory capture element 58 (FIG. 4), can operate upon the first and second image data. Due to mathematical constraints described below, at least four trajectories are used as inputs. However, due to real-world considerations, such as noise in the video images and other sources of error that essentially cannot be reduced to zero, it may be desirable to determine more than four trajectories, such as several dozen trajectories. The more trajectories that are determined, the more accurate the ultimate computation of relative camera pose. It should be noted that although this trajectory information represents each of at least four persons 20-26, persons 20-26 need not be unique individuals. Thus, for example, in FIG. 3, person 20 and person 22 can be the same individual who moves along two different trajectories.

Also, in the exemplary embodiment, each trajectory that is determined is substantially linear. (In this context, "substantially" linear means but for deviations from a linear path due to natural human gait or other slight deviations to be expected of humans attempting to walk in a straight line.) Persons who are not moving in a straight line within and between first and second fields of view 12 and 16 are not relevant to the exemplary method. Nevertheless, in other embodiments the trajectories have any shape that can be mathematically characterized in a way that enables the location of a person or other subject at a future point in time to be predicted. In addition, at least two of the trajectories should be different from each other. For example, in the exemplary embodiment the trajectory or path along which at least one of persons 20-26 moves is not parallel to the trajectory or path along which at least one other of persons 20-26 moves.

Determining such trajectory information can be performed in any suitable manner and involve any suitable degree of automation. For example, a fully automated method (not described herein) could be based upon image processing algorithms that identify and analyze moving objects in video information. A less automated method can include a human operator (user) viewing the first and second image data on display 52 (FIG. 4) and identifying the persons 20-26 (FIG. 1) who appear to be moving in a straight line between the first field of view (represented by the first image data) and the second field of view (represented by the second image data). The screen displays or views that such a human operator or user would see by viewing the first and second image data are not shown for purposes of clarity.

Figure 6:
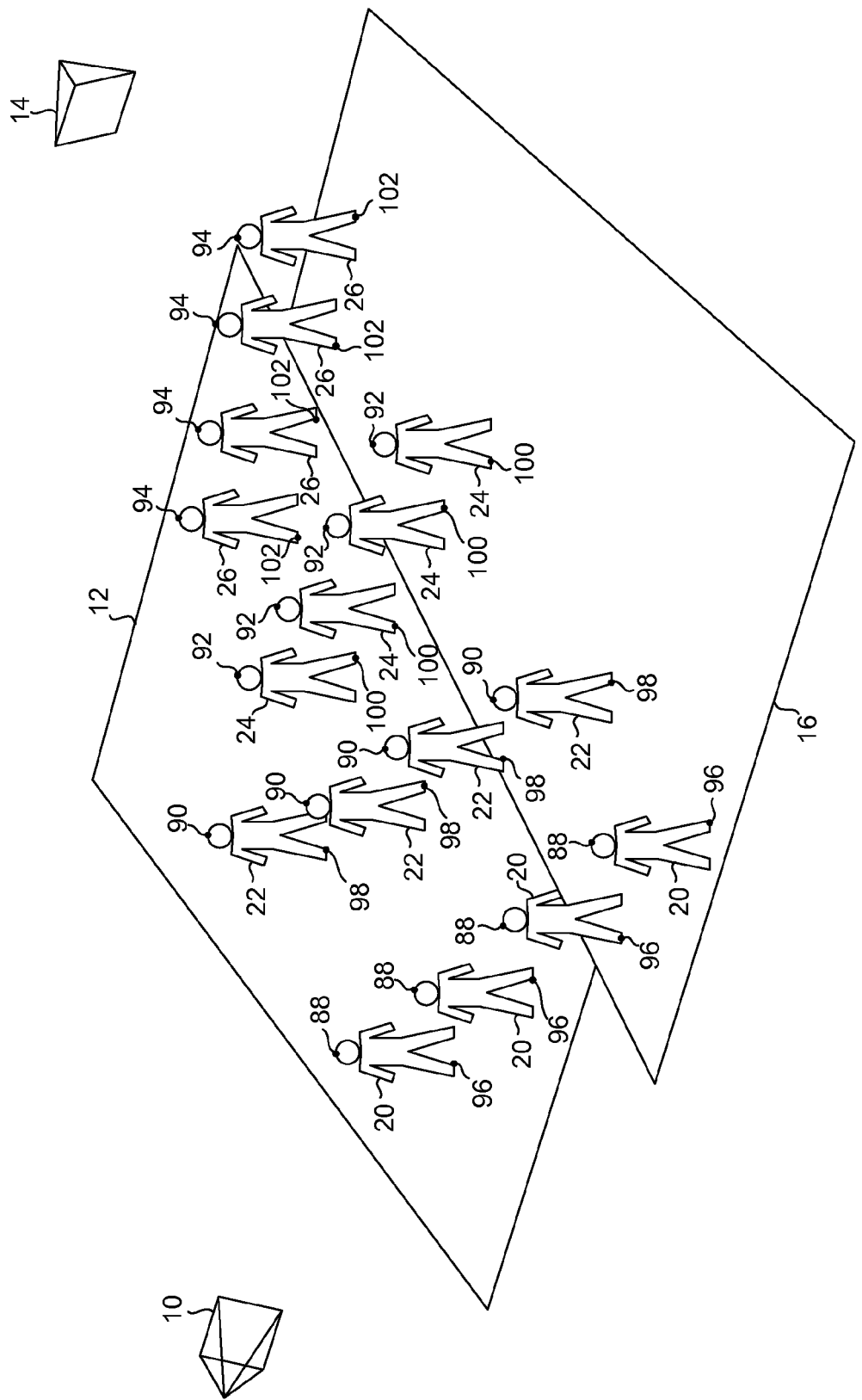
FIG. 6 is similar to FIG. 3, but showing exemplary head position points and foot position points defined by the pedestrian trajectories.

As indicated by block 80, head and foot position points are determined for each trajectory determined in accordance with block 78. For example, computer system 32, operating in accordance with line determination element 60 (FIG. 4), can operate upon the first and second image data. The term "head position points" refers to points in the image data at which the head of the person who is the subject of a trajectory is substantially located at successive points in time (e.g., in successive video frames). Although the screen displays or views that a user would see by viewing the first and second image data are not shown for purposes of clarity, exemplary head position points 88, 90, 92 and 94 of persons 20, 22, 24 and 26, respectively, are shown from the observer's-eye perspective in FIG. 6. The term "foot position points" similarly refers to points in the image data at which the foot of the person who is the subject of a trajectory is substantially located at successive points in time. For each trajectory, at each such point in time, both a head position point and a corresponding foot position point are determined. Exemplary foot position points 96, 98, 100 and 102 of persons 20, 22, 24 and 26, respectively, are shown from the observer's-eye perspective in FIG. 6.

Determining head and foot position points can be performed in any suitable manner and involve any suitable degree of automation. For example, a fully automated method (not described herein) could be based upon image processing algorithms that identify a person's head and feet in video information. A less automated method can include a user viewing the first and second image data on display 52 (FIG. 4) and, using mouse 50, marking head positions 88-94 and foot positions 96-102 in a manner that identifies these head and foot positions as trajectory information in computer system 32.

As indicated by block 82, (at least) eight lines are determined from the head and foot position points in the first image data, and (at least eight) corresponding lines are determined from the head and foot position points in the second image data. For example, computer system 32, operating in accordance with line determination element 60 (FIG. 4), can operate upon the head and foot position points. A first set of eight exemplary lines 104, 106, 108, 110, 112, 114, 116 and 118 are shown (in solid line) from the observer's-eye perspective in FIG. 7. Lines 104, 106, 108 and 110 are referred to as head lines, and lines 112, 114, 116 and 118 are referred to as foot lines. A second set of eight exemplary lines 120, 122, 124, 126, 128, 130, 132 and 134 are similarly shown (in broken line) from the observer's-eye perspective in FIG. 7. Lines 120, 122, 124 and 126 are head lines, and lines 128, 130, 132 and 134 are foot lines.

Head lines 104-110 can be determined by performing a line-fitting method upon those head position points 88-94, respectively, in the first image data. Similarly, foot lines 104-110 can be determined by performing a line-fitting method upon those foot position points 96-102, respectively, in the first image data. The head and foot lines 120-126 and 128-134, respectively, in the second image data can be similarly determined by performing a line-fitting method upon those head position points 88-94 in the second image data and those of the foot position points 96-102 in the second image data. For purposes of illustration, the eight lines 104-118 in the first image data and the corresponding eight lines 120-134 in the second image data (shown in broken line) are shown as being co-linear. However, due to measurement error and other factors, a line 104-118 in the first image data that is determined in the manner described above likely will not be precisely co-linear with the corresponding line 120-134 in the second image data. For this reason, the refinement method described below may be included.

As indicated by block 84, first and second planar homographies are computed using at least the above-described eight lines in the first image data and eight lines in the second image data. For example, computer system 32, operating in accordance with homography computation element 62 (FIG. 4), can operate upon the lines. As well understood in the art, a planar homography is a projective transformation that maps points (and lines) from one plane to another plane. In the context of the exemplary embodiment, each of the first and second planar homographies represents a relationship between each line in the first image data and a corresponding line in the second image data.

Although in other embodiments the first planar homography could be computed from the four corresponding foot lines in the first and second image data, and the second planar homography could be computed from the four corresponding head lines in the first and second image data, in the exemplary embodiment a refinement method is included in which the second planar homography is ultimately computed from (i.e., in response to) the first planar homography. The refinement method exploits the fact that a person's head and feet are substantially vertically aligned and thus each head position point and corresponding foot position point are substantially vertically aligned.

Figure 7:
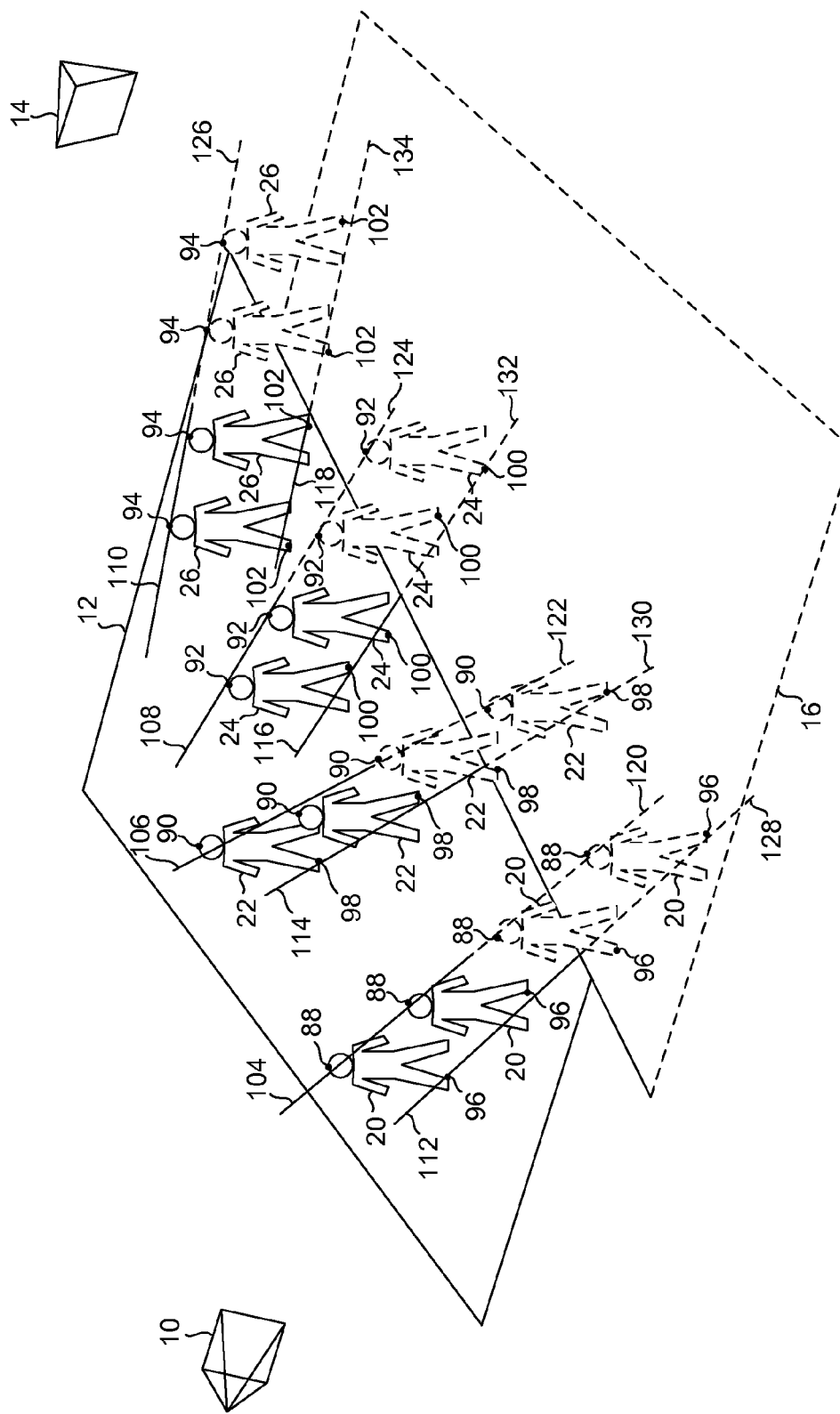
FIG. 7 is similar to FIG. 6, but showing head lines and foot lines fitted to the exemplary head position points and foot position points.

In the exemplary embodiment, the first planar homography is computed from four or more corresponding foot lines 112-118 and 128-134; the first planar homography is not computed from any of head lines 104-110. In the exemplary embodiment, the first planar homography represents a relationship between each foot line 112-118 in first image data and each corresponding foot line 128-134 in the second image data. Again, although each foot line 112-118 in first image data and each corresponding foot line 128-134 in the second image data are shown in FIG. 7 as being co-linear for purposes of illustration, the relationship is likely to be less than perfectly co-linear due to measurement inaccuracies. The first planar homography thus embodies the error or degree to which the corresponding lines in the first and second image data are not co-linear. The refinement method adjusts the first planar homography to ensure co-linearity between the first and second planar homographies.

Figure 8A:
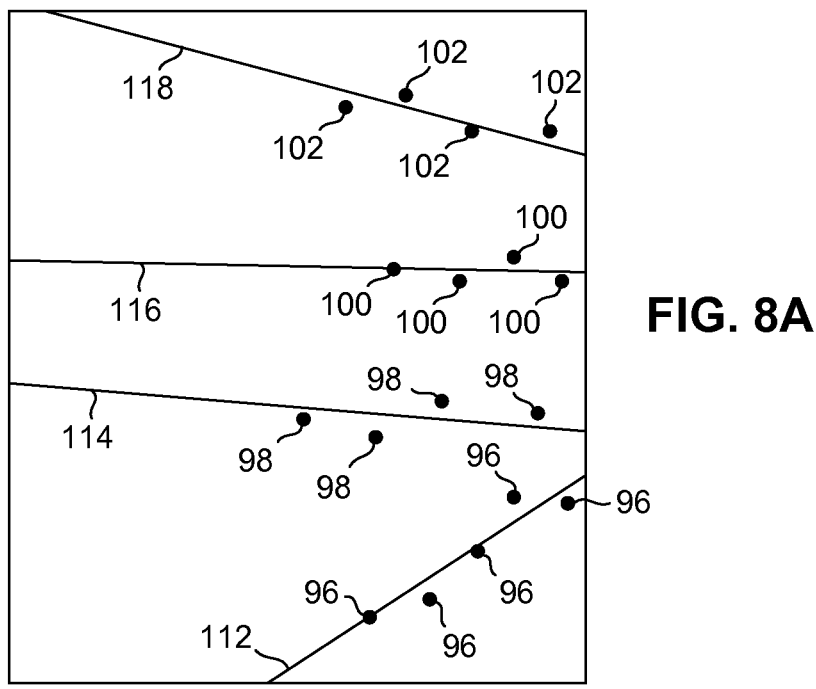
FIG. 8A illustrates an exemplary image corresponding to the first image data, showing the foot position points and foot lines.
Figure 8B:
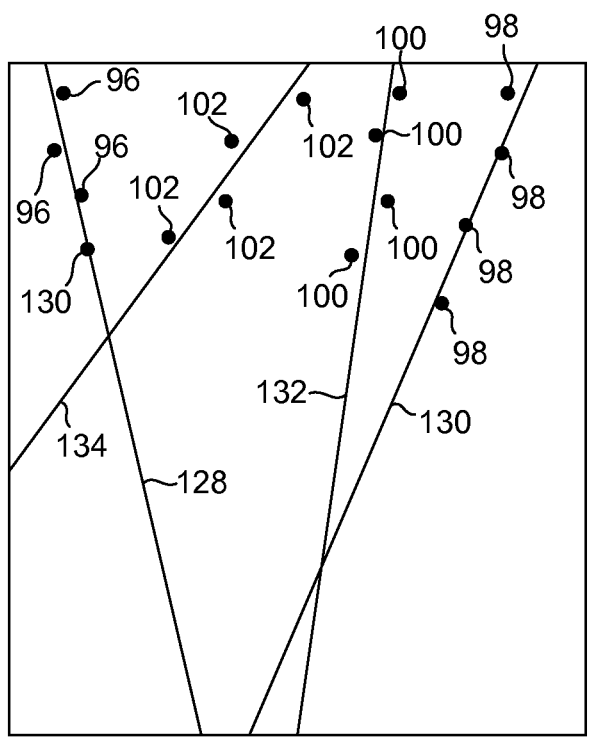
FIG. 8B illustrates an exemplary image corresponding to the second image data, showing the foot position points and foot lines.

Foot lines 112-118 are illustrated in FIG. 8A, which is a view from the perspective of first camera 10 (rather than the observer's-eye view of FIG. 7). A user can view an image similar to FIG. 8A on display 52 (FIG. 4) by causing computer system 32 to display foot lines 112-118 and their corresponding foot position points 96-102 in the first image data. Similarly, foot lines 128-134 are illustrated in FIG. 8B, which is a view from the perspective of second camera 14 (rather than the observer's-eye view of FIG. 7). A user can view an image similar to FIG. 8B on display 52 (FIG. 4) by causing computer system 32 to display foot lines 112-118 and their corresponding foot position points 96-102 in the second image data. Note that for purposes of illustration some additional foot position points 96-102 are shown in FIGS. 8A-B that are not shown in FIG. 7. It should also be understood that positions and orientations of foot lines 112-118 and 128-134 in FIGS. 8A-B are shown for purposes of illustration only and may not correspond to the perspectives of first and second cameras 10 and 14 that are conveyed by FIGS. 1, 3, 6 and 7.

The first planar homography can be computed by, for example, performing a discrete linear transform on the above-referenced plurality of foot lines. The discrete linear transform produces a 3×3 matrix H, representing the first planar homography.

Foot lines 112-118 are then projected onto the second image data using the first planar homography or matrix H:

$$l^b = H^{-T} l^a \quad (1)$$

where $l^a$ is a foot line in the first image data, $l^b$ is a corresponding foot line in the second image data and H is the homography between the first camera and the second camera.

Figure 9A:
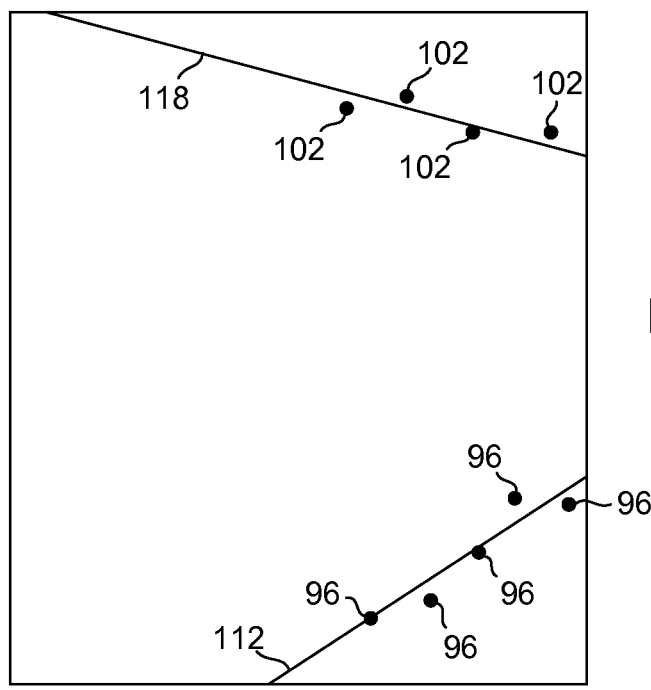
FIG. 9A is similar to FIG. 8A but showing only two foot lines for purposes of clarity.
Figure 9B:
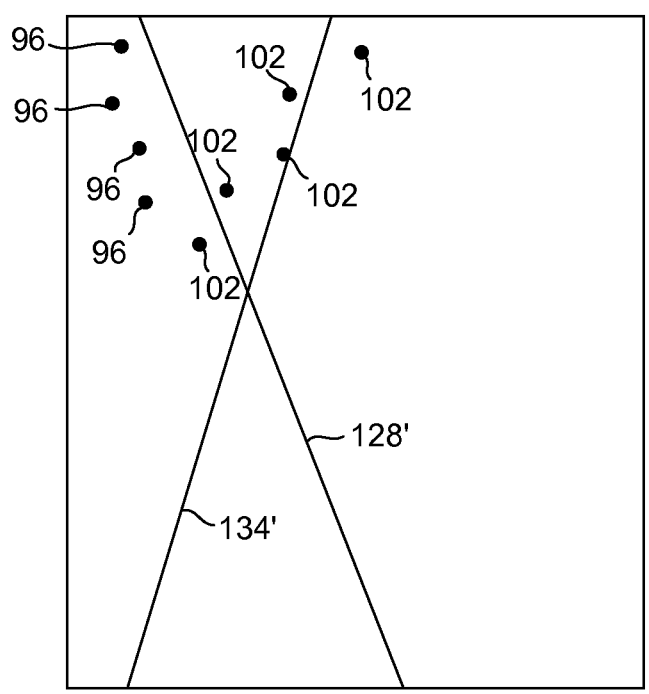
FIG. 9B illustrates an image resulting from projecting the foot lines in the first image data onto the second image data using a first planar homography.

The projection of foot lines 112-118 onto the second image data using the first planar homography or matrix H is illustrated in FIGS. 9A-B. For purposes of clarity in FIG. 9A, which is otherwise the same as FIG. 8A, only foot lines 112 and 118 are shown, and foot lines 114 and 116 are omitted. Following the projection of foot lines 112-118 in the first image data onto the second image data using the first planar homography or matrix H, the original foot lines 128-134 (FIG. 8B) in the second image data are discarded and replaced by the results of the projection, shown as foot lines 128' and 134' in FIG. 9B. As in FIG. 9A, for purposes of clarity in FIG. 9B, only foot lines 128' and 134' are shown, and the two foot lines that replace the original foot lines 130 and 132 in the second image data are omitted. Note in FIG. 9B that foot lines 128' and 134' in the second image data that represent the results of the projection are not the same as the original foot lines 128 and 134 in FIG. 8B before the projection. For example, note that foot line 128' in FIG. 9B appears to have translated rightward of the location of the original foot line 128 in FIG. 8B and rotated slightly. Similarly, foot line 134' in FIG. 9B appears to have rotated severely and translated slightly with respect to foot line 134 in FIG. 8B. In the absence of measurement error and other inaccuracies, the locations and orientations of foot lines 128' and 134' in FIG. 9B would be exactly the same as the locations and orientations of foot lines 128 and 134 in FIG. 8B.

As part of the above-referenced refinement method, a least-squares line-fitting method, such as the well-known Levenberg-Marquardt method, can then be applied to the first planar homography. The refinement method can generally be described with reference to FIGS. 10-11 and more specifically be described with reference to the equations below.

Each of the (at least four) foot lines in the first image data can be described using two numbers: a slope and an intercept. The first planar homography H can be described using eight numbers. (Although H is a 3×3 matrix and thus consists of nine numbers, there is scalar uncertainty which eliminates one degree of freedom.) As described more fully by the equations below, the Levenberg-Marquardt method iteratively makes small adjustments to the parameters of the foot lines in the first image data and the matrix elements of the first planar homography until the collective least-squares error for all of the foot lines in both the first and second image data falls below a predetermined threshold. Using the resulting or adjusted first planar homography H' promotes a more accurate result for the relative pose computation than if the original first planar homography H were used.

$$\operatorname*{argmin}_{\{l_i^a\}, H} \sum_{i=0}^{l} \left( \sum_{j=0}^{m} d(x_j^a, l_i^a)^2 + \sum_{k=0}^{n} d(x_k^b, H^{-T} l_i^a)^2 \right) \quad (2)$$

where $l_i^a$ is the $i^{th}$ foot line in the first image data, $x_j^a$ is the $j^{th}$ foot point in the first image data, $x_k^b$ is the $k^{th}$ foot point in the second image data, H is the homography between the first and second camera, and $d(x,l)^2$ is the square distance between a point and a line.

Figure 10A:
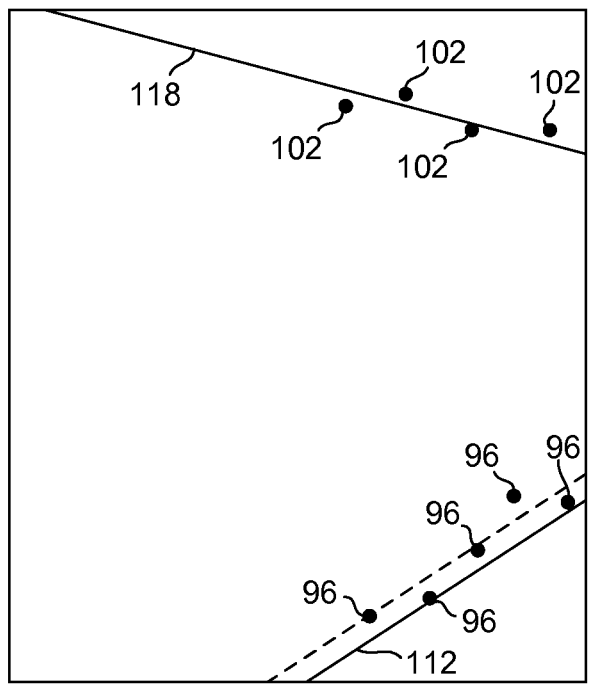
FIG. 10A illustrates an aspect of a refinement process, in which an exemplary adjustment is made to a foot line.
Figure 10B:
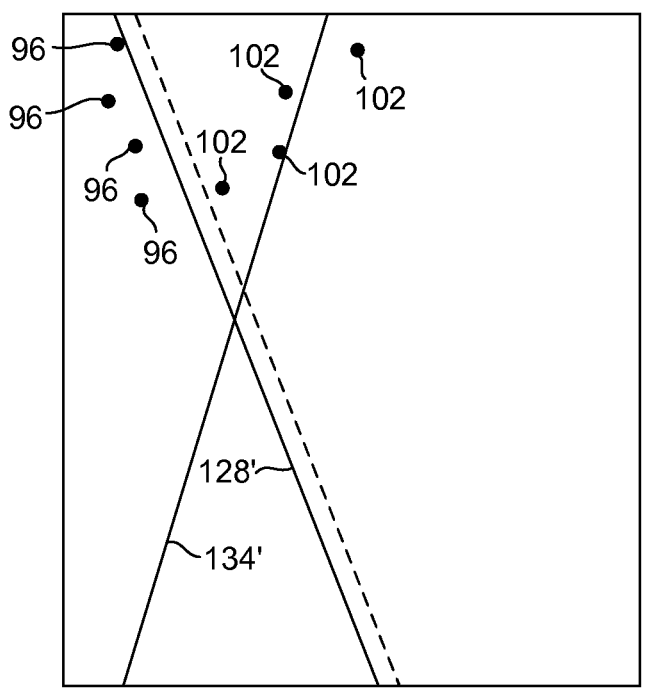
FIG. 10B illustrates a result of the adjustment shown in FIG. 10A in the image corresponding to the second image data.

Adjustment of the slopes and intercepts using the Levenberg-Marquardt method can be visualized with reference to FIGS. 10-11. As illustrated in FIG. 10A, the intercept of foot line 112 can be, for example, adjusted downwardly from its original position shown in FIG. 9A (which is also shown in broken line in FIG. 10A). If, for example, the intercept of foot line 112 is adjusted in this manner while leaving the first planar homography H unchanged and leaving foot line 118 (and the other two foot lines 114 and 116 in the first image data that are not shown in FIG. 10A for purposes of clarity) unchanged, then the next iteration of Equation 2 might result in, for example, foot line 128' in the second image data translating slightly to the left (i.e., a change in intercept), as shown in FIG. 10B. Note in FIG. 10B that foot line 128' appears to be slightly better fitted to foot position points 96 than it was in its previous position (shown in broken in line in FIG. 10B).

Figure 11A:
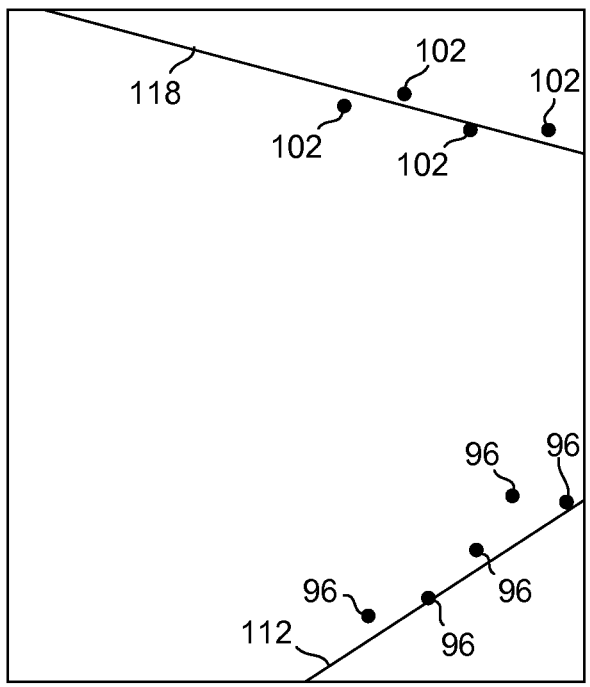
FIG. 11A illustrates another aspect of the refinement process, in which an exemplary adjustment is made to the first planar homography.
Figure 11B:
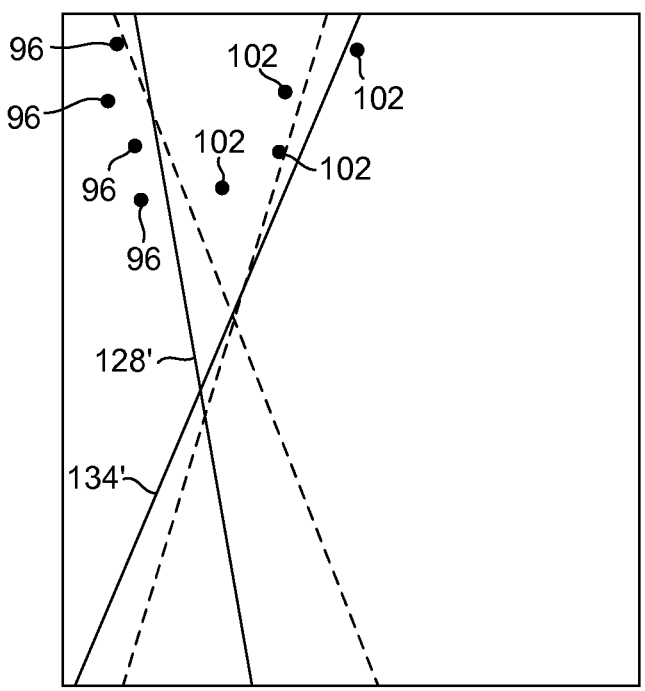
FIG. 11B illustrates a result of the adjustment shown in FIG. 11A in the image corresponding to the second image data.

Similarly, as illustrated in FIG. 11A, in an exemplary iteration of the Levenberg-Marquardt method one or more of the numbers describing the first planar homography H can be adjusted, while leaving the slopes and intercepts of foot lines 112-118 unchanged. Such an adjustment might result, for example, in rotations and translations (i.e., changes in slope and intercept) of one or more of foot lines 128' and 134' (or the other foot lines in the second image data that are not shown in FIG. 11B for purposes of clarity). The previous positions of foot lines 128' and 134' prior to such resulting rotations and translations are shown in broken line in FIG. 11B.

The second planar homography can then be computed in response to the first planar homography by, for example, computing a vertical vanishing point and a characteristic ratio in response to each foot position point and corresponding head position point, and then computing the second planar homography in response to the first planar homography, the vertical vanishing point and the characteristic ratio. Referring back to FIG. 6, a vertical vanishing point can be determined for each of persons 20, 22, 24 and 26 as seen through each of cameras 10 and 14. For example, axes (not shown) can be defined that extend from each head position point 88 of person 20 to the corresponding foot position point 96 of that person 20 for each image or instance in which person 20 appears. Viewed through, for example, camera 10, such axes will not appear precisely vertical but rather will converge at a vertical vanishing point. (The term "vertical" is defined as normal to the ground plane on which persons 20, 22, 24 and 26 appear to walk in the video images.) By exploiting the fact that a person's head region and foot region are substantially vertically aligned, a vertical vanishing point established from pedestrian motion or trajectory can be used to help compute a second planar homography H2.

As understood by persons skilled in the art, the characteristic ratio also relates to vertically oriented objects, with the additional constraint that the objects are all the same height. By exploiting the fact that pedestrians are approximately the same height as each other (e.g., rarely under five feet (1.5 m) or much over six feet (1.8 m) for an average person) in comparison to the height of a camera from the surface or ground plane on which the persons are walking, a characteristic ratio established from pedestrian motion or trajectory can be used to help compute the second planar homography 112. In the context of the exemplary embodiment, the characteristic ratio is defined by:

$$\mu=(\text{height of camera}-\text{height of person})/\text{height of camera} \quad (3)$$

where the "height" is the height above the planar surface on which persons 20-24 (FIGS. 1, 3, 6 and 7) are walking. Note, however, that the person's actual height is not relevant, as it is only the ratio above that is relevant.

The following matrix multiplication equations more fully describe this computation of the second planar homography 112 in response to the first planar homography H, the vertical vanishing point, and the characteristic ratio:

$$H_2 = G_2 H G_1^{-1} \quad (4)$$

$$G = I + (1-\mu)\frac{vh^T}{v^T h}$$

$$h = \begin{bmatrix} v_x - c_x \\ v_y - c_y \\ f^2 - c_x(v_x - c_x) - c_y(v_y - c_y) \end{bmatrix}$$

where G1 represents the homology between the ground and ceiling planes in the first camera, G2 represents the homology between the ground and ceiling planes in the second camera, H is the ground plane homography between the first and second cameras and H2 is the ceiling plane homography between the first and second cameras. An arbitrary homology G is defined by the identity matrix I, the characteristic ratio $\mu$, the image location of the vertical vanishing point v and the image location of the horizon line h. The horizon line h is determined by the camera's focal length f, and the x- and y-components $v_x$ and $v_y$ of the vertical vanishing point and the camera's principal point $c_x$ and $c_y$.

Returning to FIG. 5, as indicated by block 86, the relative camera pose can be computed from the first and second planar homographies H and H2 using a projection method. Computer system 32, operating in accordance with projection element 64 (FIG. 4), can operate upon the first and second planar homographies. More specifically, the first and second planar homographies H and H2 are used to produce four 3×4 matrices P1, P2, P3 and P4:

$$H^T F + F^T H = 0$$

$$H2^T F + F^T H2 = 0$$

$$v2^T F v = 0 \quad (4)$$

where H is the first planar homography, H2 is the second planar homography, v is the location of the vertical vanishing point in the first image data, v2 is the location of the vertical vanishing point in the second image data, and F is the fundamental matrix between the first and second cameras. The fundamental matrix is computed as a least-squares solution to the system of equations in (4). The essential matrix E is extracted from the fundamental matrix F via:

$$E = K_2 F K_1 \quad (5)$$

where $K_1$ and $K_2$ are the intrinsic calibration matrices of the first and second cameras. Two possible relative rotations and two possible relative translations are determined by factoring $E = U \Sigma V^T$ using singular value decomposition.

$$R_1 = UW^T V^T$$

$$R_2 = UWV^T$$

$$t_1 = +u_3$$

$$t_2 = -u_3 \quad (6)$$

where $R_1$ is the first possible relative rotation matrix, $R_2$ is the second possible rotation matrix, $t_1$ is the first possible relative translation, $t_2$ is the second possible relative translation and, by definition $u_3$ is the third column of U and $$W = \begin{bmatrix} 0 & 1 & 0 \\ -1 & 0 & 0 \\ 0 & 0 & 1 \end{bmatrix} \quad (7)$$

The camera four possible camera projection matrices of the second camera are then $$P_1 = K_2[R_1|t_1]$$

$$P_2 = K_2[R_1|t_2]$$

$$P_3 = K_2[R_2|t_1]$$

$$P_4 = K_2[R_2|t_2] \quad (8)$$

Each of the matrices P1, P2, P3 and P4 represents a solution to the relative camera pose, but only one of them is the correct solution. It can be determined which of the four possible solutions is correct by backprojecting two or more foot position points in the first image data and two or more foot position points in the second image data onto the ground plane to reproduce a path that the person traveled. Any of the eight lines in the first image data and the corresponding line in the second image data can be used. That is, points from any of the four foot lines in the first image data and corresponding four foot lines in the second image data can be used. For example, as illustrated in FIG. 12A, points from line 112 in the first image data and the corresponding line 128 (or, in an embodiment that includes the above-described refinement method, line 128') can be used.

Figure 12A:
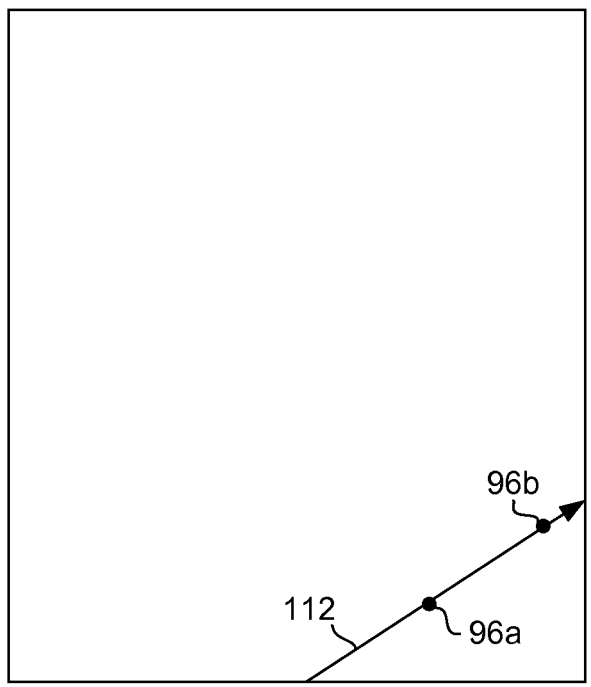
FIG. 12A illustrates an exemplary image corresponding to the first image data but showing only a single foot line, two foot position points, and the direction of the trajectory.
Figure 12B:
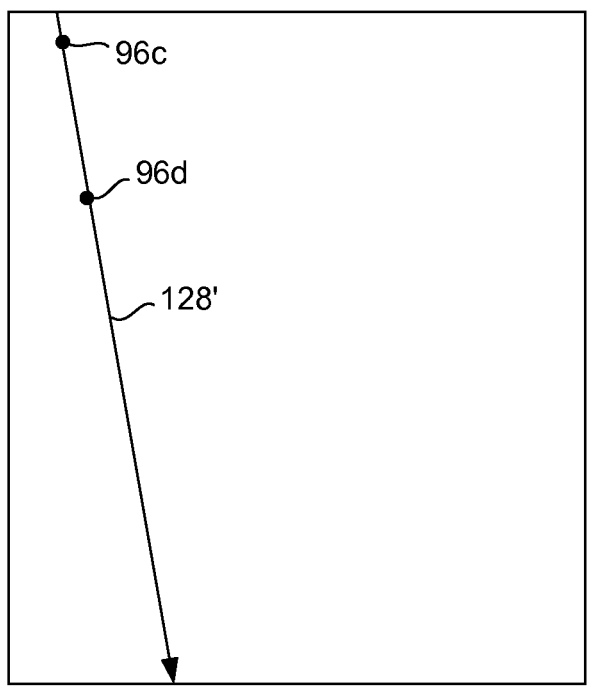
FIG. 12B illustrates an exemplary image corresponding to the second image data but showing only a single foot line, two foot position points, and the direction of the trajectory.

In this example, because the direction of travel of person 20 (FIGS. 1, 3 and 6) is known, it can be determined that in the first image data foot position point 96a occurred earlier in time than foot position point 96b, as indicated by the arrowhead on line 112 in FIG. 12A. It can similarly be determined that in the second image data foot position point 96c occurred earlier in time than foot position point 96d, as indicated by the arrowhead on line 128' in FIG. 12B. Thus, the trajectory of person 20 can be determined to have spanned foot position points 96a, 96b, 96c and 96d in that order.

Figure 13:
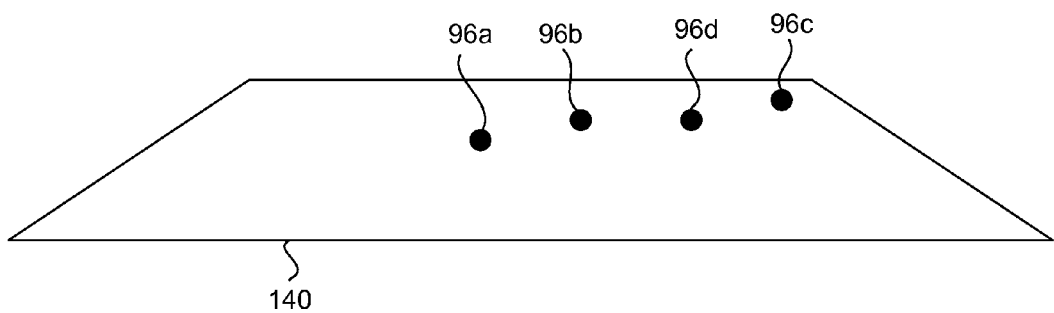
FIG. 13 illustrates the result of backprojecting foot position points onto the ground plane using a solution obtained from the planar homographies.

Each of the four solution matrices P1, P2, P3 and P4 can be applied to foot position points 96a, 96b, 96c and 96d, resulting in a projection of foot position points 96a, 96b, 96c and 96d into the ground plane 140, as shown in FIG. 13. For example, the exemplary projection shown in FIG. 13 can represent the result of applying solution matrix P1. In the projection shown in FIG. 13, it can be noted that foot position point 96c and 96d are out of order with respect to the trajectory of person 20 that was determined above. That is, although the foot region of person 20 may have moved from foot position point 96a to foot position point 96b, it did not then move to foot position point 96d as shown in the projection.

Accordingly, it can be determined that the projection is incorrect and that the solution matrix P1 should be discarded. The process can be repeated with solution matrices P2, P3 and P4 until one of them results in a trajectory that matches the determined trajectory of person 20.

When the projection resulting from applying a solution matrix is found to match the determined trajectory, the relative pose can be recovered from that solution matrix. The relative translation vector t is described with respect to an arbitrary scale, defined such that the cameras are a unit distance apart. The separation of the ground and ceiling planes is computed in terms of this arbitrary unit, and the unknown scale factor is recovered by assuming the ground and ceiling planes are actually separated by 1.8 m.

While one or more embodiments of the invention have been described as illustrative of or examples of the invention, it will be apparent to those of ordinary skill in the art that other embodiments are possible that are within the scope of the invention. Accordingly, the scope of the invention is not to be limited by such embodiments but rather is determined by the appended claims.

What is claimed is:

1. A method for determining a relative pose between two cameras, comprising the steps of:
   receiving first image data representing a first field of view of a first video camera;
   receiving second image data representing a second field of view of a second video camera, at least a portion of the first field of view adjacent to at least a portion of the second field of view;
   determining trajectory information representing each of at least four subjects moving between the first field of view and the second field of view along a mathematically characterizable trajectory;
   determining, for each subject represented by the trajectory information, a plurality of head position points in the first image data and a plurality of head position points in the second image data, each plurality of head position points corresponding to successive positions of a head region of a subject at a corresponding plurality of timepoints spanning a time period;
   determining, for each subject represented by the trajectory information, a plurality of foot position points in the first image data and a plurality of foot position points in the second image data, each plurality of foot position points corresponding to the plurality of head position points and corresponding to successive positions of a foot region of the subject at a corresponding plurality of timepoints spanning a time period;
   determining at least eight lines in the first image data comprising at least four head lines and at least four foot lines by fitting each plurality of head position points in the first image data to one of the head lines and fitting each plurality of foot position points to one of the foot lines;
   determining at least eight lines in the second image data comprising at least four head lines and at least four foot lines by fitting each plurality of head position points in the second image data to one of the head lines and fitting each plurality of foot position points to one of the foot lines, each head line in the second image data corresponding to one head line in the first image data, each foot line in the second image data corresponding to one foot line in the first image data;
   computing a first planar homography and a second planar homography, each planar homography representing a relationship between each line in the first image data and a corresponding line in the second image data; and
   computing the relative pose between the first video camera and the second video camera in response to the first planar homography and second planar homography.

2. The method of claim 1, wherein the subjects are pedestrians.

3. The method of claim 1, wherein the mathematically characterizable trajectory is a substantially linear trajectory.

4. The method of claim 1, wherein the step of computing the relative pose between the first video camera and the second video camera comprises:
   backprojecting a plurality of foot position points onto a ground plane; and
   determining if the backprojected plurality of foot position points matches the trajectory information.

5. The method of claim 1, wherein the step of computing a first planar homography and a second planar homography comprises:
   computing the first planar homography in response to a plurality of the foot lines, the first planar homography representing a relationship between each foot line in the first image data and a corresponding foot line in the second image data; and
   computing the second planar homography in response to the first planar homography.

6. The method of claim 5, wherein computing the first planar homography comprises performing a discrete linear transform on the plurality of the foot lines.

7. The method of claim 5, further comprising applying a least-squares line-fitting method to the first planar homography before the step of computing the second planar homography.

8. The method of claim 7, wherein the least-squares line-fitting method comprises the Levenberg-Marquardt method.

9. The method of claim 5, wherein the step of computing the second planar homography in response to the first planar homography comprises:
   computing a vertical vanishing point and a characteristic ratio in response to each foot position point and corresponding head position point; and
   computing the second planar homography in response to the first planar homography, the vertical vanishing point and the characteristic ratio.

10. The method of claim 1, wherein the step of computing the relative pose between the first video camera and the second video camera comprises:
    mapping an arbitrary ground point in the first camera to a corresponding image location on the ceiling plane of the first camera, a corresponding image location on the ground plane of the second camera, and a corresponding image location on the ceiling plane of the second camera;
    triangulating 3D positions of a ground point and a ceiling point using the corresponding image locations; and
    determining a distance between triangulated 3D points to resolve a scale of a relative translation vector.

11. A system for determining a relative pose between two cameras, comprising:
    a programmed processing system comprising a processor subsystem and a memory subsystem, the programmed processing system executing instructions to:
    receive first image data representing a first field of view of a first video camera;
    receive second image data representing a second field of view of a second video camera, at least a portion of the first field of view adjacent to at least a portion of the second field of view;

determine trajectory information representing each of at least four subjects moving between the first field of view and the second field of view along a mathematically characterizable trajectory;

determine, for each subject represented by the trajectory information, a plurality of head position points in the first image data and a plurality of head position points in the second image data, each plurality of head position points corresponding to successive positions of a head region of a subject at a corresponding plurality of timepoints spanning a time period;

determine, for each subject represented by the trajectory information, a plurality of foot position points in the first image data and a plurality of foot position points in the second image data, each plurality of foot position points corresponding to the plurality of head position points and corresponding to successive positions of a foot region of the subject at a corresponding plurality of timepoints spanning a time period;

determine at least eight lines in the first image data comprising at least four head lines and at least four foot lines by fitting each plurality of head position points in the first image data to one of the head lines and fitting each plurality of foot position points to one of the foot lines;

determine at least eight lines in the second image data comprising at least four head lines and at least four foot lines by fitting each plurality of head position points in the second image data to one of the head lines and fitting each plurality of foot position points to one of the foot lines, each head line in the second image data corresponding to one head line in the first image data, each foot line in the second image data corresponding to one foot line in the first image data;

compute a first planar homography and a second planar homography, each planar homography representing a relationship between each line in the first image data and a corresponding line in the second image data; and compute the relative pose between the first video camera and the second video camera in response to the first planar homography and second planar homography.

12. The system of claim 11, wherein the subjects are pedestrians.

13. The system of claim 11, wherein the mathematically characterizable trajectory is a substantially linear trajectory.

14. The system of claim 11, wherein the programmed processing system executes instructions to compute the relative pose between the first video camera and the second video camera by executing instructions to:
backproject a plurality of foot position points onto a ground plane; and
determine if the backprojected plurality of foot position points matches the trajectory information.

15. The system of claim 11, wherein the programmed processing system executes instructions to compute a first planar homography and a second planar homography by executing instructions to:
compute the first planar homography in response to a plurality of the foot lines, the first planar homography representing a relationship between each foot line in the first image data and a corresponding foot line in the second image data; and
compute the second planar homography in response to the first planar homography.

16. The system of claim 15, wherein the programmed processing system executes instructions to compute the first planar homography by executing instructions to perform a discrete linear transform on the plurality of the foot lines.

17. The system of claim 15, further comprising the programmed processing system executing instructions to apply a least-squares line-fitting method to the first planar homography before the step of computing the second planar homography.

18. The system of claim 17, wherein the least-squares line-fitting method comprises the Levenberg-Marquardt method.

19. The system of claim 15, wherein the programmed processing system executes instructions to compute the second planar homography in response to the first planar homography by executing instructions to:
compute a vertical vanishing point and a characteristic ratio in response to each foot position point and corresponding head position point; and
compute the second planar homography in response to the first planar homography, the vertical vanishing point and the characteristic ratio.

20. The system of claim 11, wherein the programmed processing system executes instructions to compute the relative pose between the first video camera and the second video camera by executing instructions to:
map an arbitrary ground point in the first camera to a corresponding image location on the ceiling plane of the first camera, a corresponding image location on the ground plane of the second camera, and a corresponding image location on the ceiling plane of the second camera;
triangulate 3D positions of a ground point and a ceiling point using the corresponding image locations; and
determine a distance between triangulated 3D points to resolve a scale of a relative translation vector.

21. A computer program product stored on a non-transitory computer readable medium for determining a relative pose between two cameras, the computer program product comprising a computer-readable medium on which is stored in executable form instructions that, when executed on a computer system, cause the computer system to:
receive first image data representing a first field of view of a first video camera; receive second image data representing a second field of view of a second video camera, at least a portion of the first field of view adjacent to at least a portion of the second field of view; determine trajectory information representing each of at least four subjects moving between the first field of view and the second field of view along a mathematically characterizable trajectory; determine, for each subject represented by the trajectory information, a plurality of head position points in the first image data and a plurality of head position points in the second image data, each plurality of head position points corresponding to successive positions of a head region of a subject at a corresponding plurality of timepoints spanning a time period; determine, for each subject represented by the trajectory information, a plurality of foot position points in the first image data and a plurality of foot position points in the second image data, each plurality of foot position points corresponding to the plurality of head position points and corresponding to successive positions of a foot region of the subject at a corresponding plurality of timepoints spanning a time period; determine at least eight lines in the first image data comprising at least four head lines and at least four foot lines by fitting each plurality of head position points in the first image data to one of the head lines and fitting each plurality of foot position points to one of the foot lines; determine at least eight lines in the second image data comprising at least four head lines and at least four foot lines by fitting each plurality of head position points in the second image data to one of the head lines and fitting each plurality of foot position points to one of the foot lines, each head line in the second image data corresponding to one head line in the first image data, each foot line in the second image data corresponding to one foot line in the first image data; compute a first planar homography and a second planar homography, each planar homography representing a relationship between each line in the first image data and a corresponding line in the second image data; and compute the relative pose between the first video camera and the second video camera in response to the first planar homography and second planar homography.

22. The computer program product of claim 21, wherein the subjects are pedestrians.

23. The computer program product of claim 21, wherein the mathematically characterizable trajectory is a substantially linear trajectory.

24. The computer program product of claim 21, wherein the programmed processing system executes instructions to compute the relative pose between the first video camera and the second video camera by executing instructions to:
   backproject a plurality of foot position points onto a ground plane; and
   determine if the backprojected plurality of foot position points matches the trajectory information.

25. The computer program product of claim 21, wherein the programmed processing system executes instructions to compute a first planar homography and a second planar homography by executing instructions to:
   compute the first planar homography in response to a plurality of the foot lines, the first planar homography representing a relationship between each foot line in the first image data and a corresponding foot line in the second image data; and
   compute the second planar homography in response to the first planar homography.

26. The computer program product of claim 25, wherein the programmed processing system executes instructions to compute the first planar homography by executing instructions to perform a discrete linear transform on the plurality of the foot lines.

27. The computer program product of claim 25, further comprising the programmed processing system executing instructions to apply a least-squares line-fitting method to the first planar homography before the step of computing the second planar homography.

28. The computer program product of claim 27, wherein the least-squares line-fitting method comprises the Levenberg-Marquardt method.

29. The computer program product of claim 25, wherein the programmed processing system executes instructions to compute the second planar homography in response to the first planar homography by executing instructions to:
   compute a vertical vanishing point and a characteristic ratio in response to each foot position point and corresponding head position point; and
   compute the second planar homography in response to the first planar homography, the vertical vanishing point and the characteristic ratio.

30. The computer program product of claim 21, wherein the programmed processing system executes instructions to compute the relative pose between the first video camera and the second video camera by executing instructions to:
   map an arbitrary ground point in the first camera to a corresponding image location on the ceiling plane of the first camera, a corresponding image location on the ground plane of the second camera, and a corresponding image location on the ceiling plane of the second camera;
   triangulate 3D positions of a ground point and a ceiling point using the corresponding image locations; and
   determine a distance between triangulated 3D points to resolve a scale of a relative translation vector.

* * * * *